United States Patent [19]

Kitamura

[11] Patent Number: 5,431,508
[45] Date of Patent: Jul. 11, 1995

[54] CONNECTING MECHANISM FOR DETACHABLY CONNECTING TWO MEMBERS TOGETHER

[75] Inventor: Takayuki Kitamura, Yokohama, Japan

[73] Assignee: Japan Aircraft Mfg. Co., Ltd., Yokohama, Japan

[21] Appl. No.: 106,821

[22] Filed: Aug. 16, 1993

[30] Foreign Application Priority Data

Mar. 31, 1993 [JP] Japan ................. 5-096786

[51] Int. Cl.⁶ ............................... B25G 3/18
[52] U.S. Cl. .................... 403/325; 403/315; 285/314; 285/316
[58] Field of Search ............. 403/315, 316, 319, 321, 403/325; 285/314, 315, 316

[56] References Cited

U.S. PATENT DOCUMENTS

| | | | |
|---|---|---|---|
| 2,942,903 | 6/1960 | Giladett | 403/321 |
| 3,345,711 | 10/1967 | McCarthy | 403/321 |
| 4,114,853 | 9/1978 | Medvick | 285/316 |
| 4,148,459 | 4/1979 | Martinez | 285/316 |
| 4,582,444 | 4/1986 | Miskinis | 403/321 |
| 4,810,145 | 3/1989 | Villas | 403/316 |
| 4,900,182 | 2/1990 | Stillwagon | 403/325 |
| 4,906,123 | 3/1990 | Weskamp et al. | 403/325 |
| 4,982,761 | 1/1991 | Kreczko et al. | 285/316 |
| 5,193,929 | 3/1993 | Kahn | 403/321 |
| 5,284,369 | 2/1994 | Kitamura | 285/316 |
| 5,290,009 | 3/1994 | Hielmann | 285/316 |

Primary Examiner—Richard A. Bertsch
Assistant Examiner—Howard R. Richman
Attorney, Agent, or Firm—Frishauf, Holtz, Goodman & Woodward

[57] ABSTRACT

A connecting mechanism has a reversely tapered fit portion, an elastically expandable collet chuck fitted on the fit portion, a locking sleeve surrounding the outer peripheral surface of the fit portion and axially slidably mounted on the outer peripheral surface of the collet chuck, and a spring for biasing the locking sleeve in its advancing direction. The locking sleeve advances with the collet chuck being fitted on the fit portion and locks the collet chuck such that the collet chuck cannot be expanded in the fit portion.

8 Claims, 4 Drawing Sheets

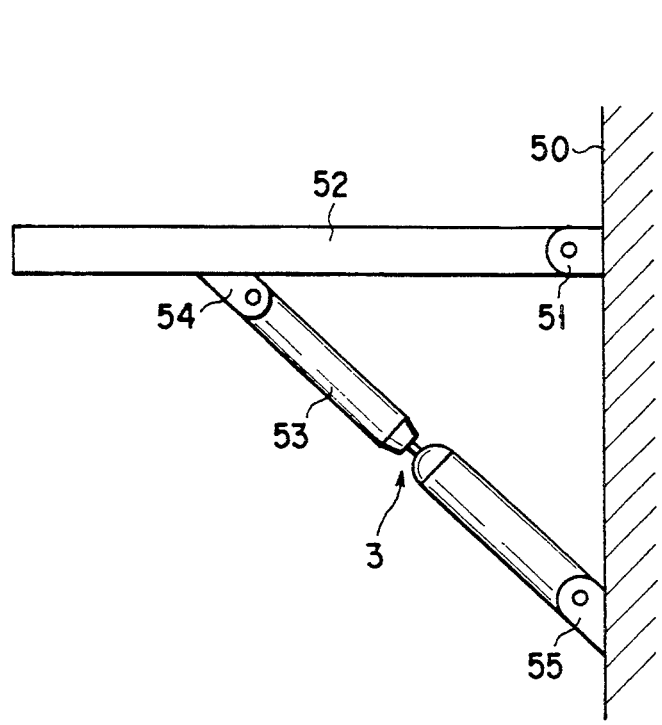
FIG. 5
FIG. 6
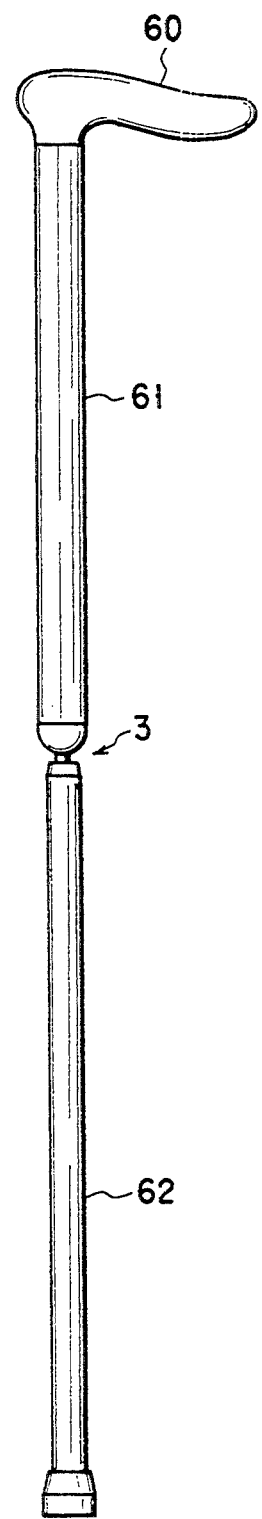
FIG. 7

CONNECTING MECHANISM FOR DETACHABLY CONNECTING TWO MEMBERS TOGETHER

BACKGROUND OF THE INVENTION

1. Field of the Invention

This invention relates to a connecting mechanism for connecting two member together, and more particularly to a connecting mechanism for detachably connecting together the respective ends of two rod members of a space craft structure, a space station structure, and the structures of any other mechanisms, apparatuses, tools or the like.

2Description of the Related Art

There have been developed various kinds of foldable and extendible truss structures of space crafts, space stations and the like. They have hinge mechanisms connecting together the respective ends of a plurality of rod members of the truss structure which is folded or extended at the hinge mechanisms so as to take their predetermined folded or extended shapes.

Such a truss structure occupies a small volume when it is folded. It is launched by a rocket or the like into the space in a folded state and is extended into a required developed shape in the space.

Although the truss structure has a complicated structure in an extended state in general, it is designed so as to occupy a minimum volume in a folded state. In this regard, rod members around the hinge mechanisms draw complicated loci when the truss structure is folded and extended. Since five or six rod members are connected to a hinge mechanism in general, the hinge mechanism has a very complicated structure. This results in a heavy weight, a poor reliability and a high manufacturing cost of the hinge mechanism. Many kinds of truss structures must be manufactured in order to obtain many different extended states. Thus, many different kinds of complicated hinge mechanisms must be made according to the different truss structures, leading to a high manufacturing cost.

An attempt has been made to develop an extending type truss structure which uses, instead of hinge mechanisms, detachable connecting mechanisms for connecting the respective ends of rod members together. The detachable connecting mechanism comprises a main body to which the respective ends of rod members are removably connected, flexible wires extending through the main body and the rode members, and springs housed in the rod members for giving a tension to the wires.

When the rod members are pulled out from the main body, they have come to be connected to the main body only by the wires so as to be rotated to be directed in any directions, whereby the truss structure can be folded or extended. In the extended state, on the other hand, the respective ends of the rod members are fixedly fitted to the main bodies, whereby the required truss structure is formed.

It is preferred that each connecting mechanism used in such an extendible truss structure is constructed such that the respective ends of the rods are securely and fixedly fitted to the main body only by the tension of the wires when the ends of the rod members are pulled toward the main body only by the tension of the wires.

SUMMARY OF THE INVENTION

The object of this invention is to provide a connecting mechanism for securely and fixedly connecting two members to each other with a relatively small force. This connecting mechanism can be used in not only the structure of a space craft and a space station but also various other apparatuses, structures, tools and the like.

In order to achieve this object, this invention provides a connecting mechanism for connecting two members each having one end, which connecting mechanism comprises a reversely tapered fit portion having a forward end and a rear end connected to said one end of either one of said two members, an elastically extended collet chuck having a cylindrical wall with a reversibly tapered inner peripheral surface, a reversely tapered outer peripheral surface and axial grooves formed in the cylindrical wall, an axially slidable cylindrical locking sleeve connected to said one end of the other member, surrounding the fit portion and having an inner peripheral surface having a shape fitted onto the outer peripheral surface of the collet chuck so as to be fitted thereto, and a spring disposed between the other member and the cylindrical locking sleeve, for urging the forward end of the fit portion.

The fit portion is inserted in the collet chuck which is in an elastically expanded state. The locking sleeve abuts against the forward end of the expanded collet chuck and is retracted against the biasing force of the spring. When the fit portion is fully inserted in the collet chuck, the collet chuck shrinks. This allows the locking sleeve to be moved forward by the biasing force of the spring. The inner peripheral surface of the locking sleeve is fitted onto the outer peripheral surface of the collet chuck, and the locking sleeve locks the collet chuck such that the collet chuck is not expanded. In this way, the members are securely and fixedly connected together.

Since the locking sleeve prevents the collet chuck from being expanded when they are in a connected state, the elastic expanding force of the collet chuck required for expanding the collet chuck upon inserting the fit portion in the collet chuck can be made minimum, and thus the force required for fitting the fit portion to the collet chuck can be made small. Due to the fact that the locking sleeve is fitted to the collet chuck after the fit portion has been fully inserted in the collet chuck, the biasing force of the spring for biasing the locking sleeve can also be made small. In spite of these small forces, the two members are securely fixedly in a reliable manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a lateral side view of an foldable shelf according to a second embodiment of this invention, in state in which the shelf in a use position;

FIG. 6 is a lateral side view of the foldable shelf of the second embodiment of this invention, in a state in which the shell is being folded; and FIG. 7 is a lateral side view of a foldable walking stick according to a third embodiment of this invention.

DETAILED DESCRIPTION OF THE PREFERRED EMBODIMENTS

Figures 1, 2:
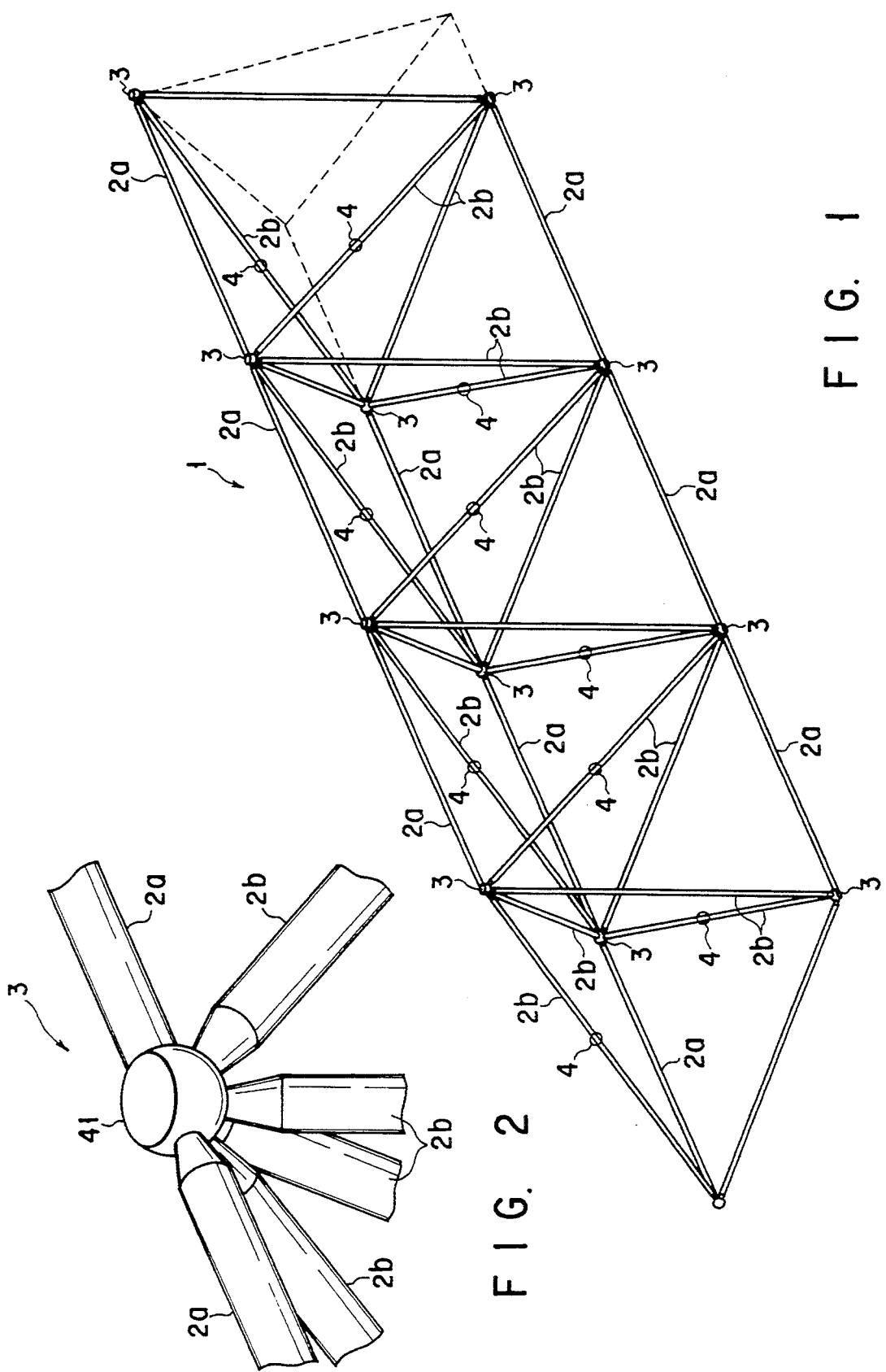
FIG. 1 is a perspective view of a first embodiment of a beam truss structure according to this invention.
FIG. 2 is an enlarged perspective view of a connecting mechanism of the first embodiment.

The preferred embodiments will be described with reference to the accompanying drawings.

The connecting mechanism of a first embodiment of this invention as shown in FIGS. 1 to 4 is applied to a connecting mechanism of an extendible truss structure of space craft or a space station. The truss structure is of a beam type. It is launched on its space orbit in a folded state, extended to take a required shape on the space orbit and used as part of the structures of the space craft or the space station.

The truss structure is formed by connecting together the corresponding ends of a plurality of two groups of rod members 2a and 2b by respective connecting mechanisms 3. Each connecting mechanism 3 is designed to lockingly connect the adjacent ends of the rod members 2a and 2b together such that each pair of a rod member 2a of the first group and a rod member 2b of the second group make a predetermined angle. After unlocked, the rod members can swing about the connecting mechanisms 3 so as to point in any directions. The first groups of rod members 2a are linearly arranged in three rows to form three parallel longitudinal rod elements, and the second group of rod members 2b constituting oblique rod elements join the adjacent longitudinal rod elements together. A folding mechanism 4 is provided on an intermediate portion of each of every other rod members 2b, i.e., each of every other oblique rod elements (hereinafter referred to as the "foldable rod element"). The foldable rod member 2b is held in a straightened state when it is locked to the folding mechanism 4, and it is folded at the folding mechanism 4 when it is unlocked therefrom.

When the first group of rod members 2a and the second group of rod members 2b adjacent thereto are rotated toward each other at the connecting mechanisms 3 and the foldable rod members 2b are bent at the folding mechanisms 4, the truss structure 1 is folded into a small size so that the truss mechanism 1 is folded to occupy a small volume. When, on the other hand, the foldable rod members 2b are unfolded so as to be aligned with each other, the truss mechanism 1 is extended to exhibit the shape as shown in FIG. 1.

The truss mechanism 1 will be described in detail. The rod members 2a and 2b are formed by pipes 11 made of carbon fiber enforced resin, aluminum alloy or the like, which are light in weight and have high mechanical strength and high rigidity. The first group of rod members 2a are arranged series in an axial direction of the beam-shaped truss structure 1 and constitute the longitudinal rod elements. The second group of rod members 2b are arranged crosswise of the first group of rod members 2a disposed adjacent to the second group of rod members 2b and constitute the oblique rod elements.

Figure 3:
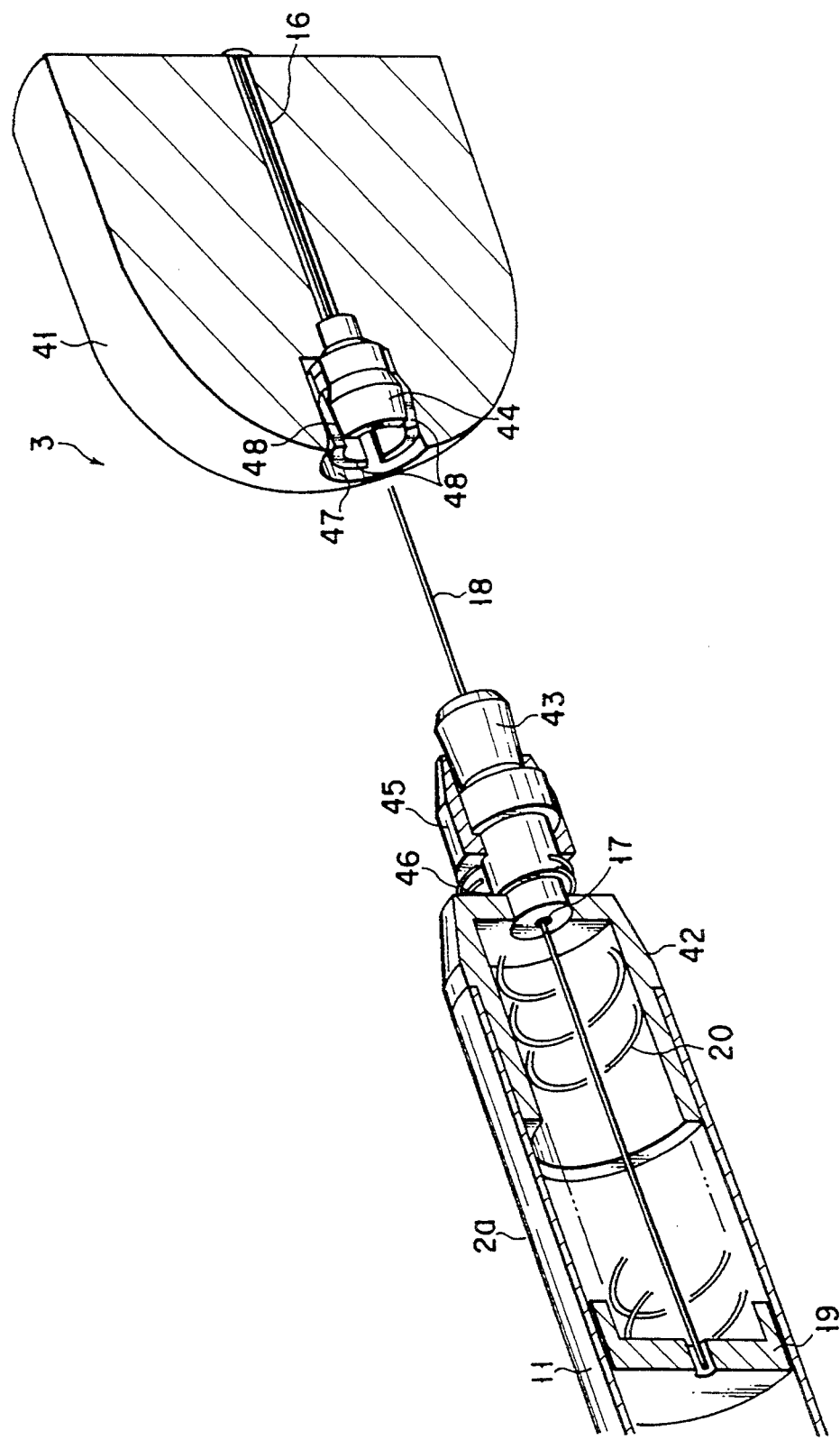
FIG. 3 is an enlarged perspective view of part of the connecting mechanism in a state in which the fit portion is disengaged from the collet chuck.
Figure 4:
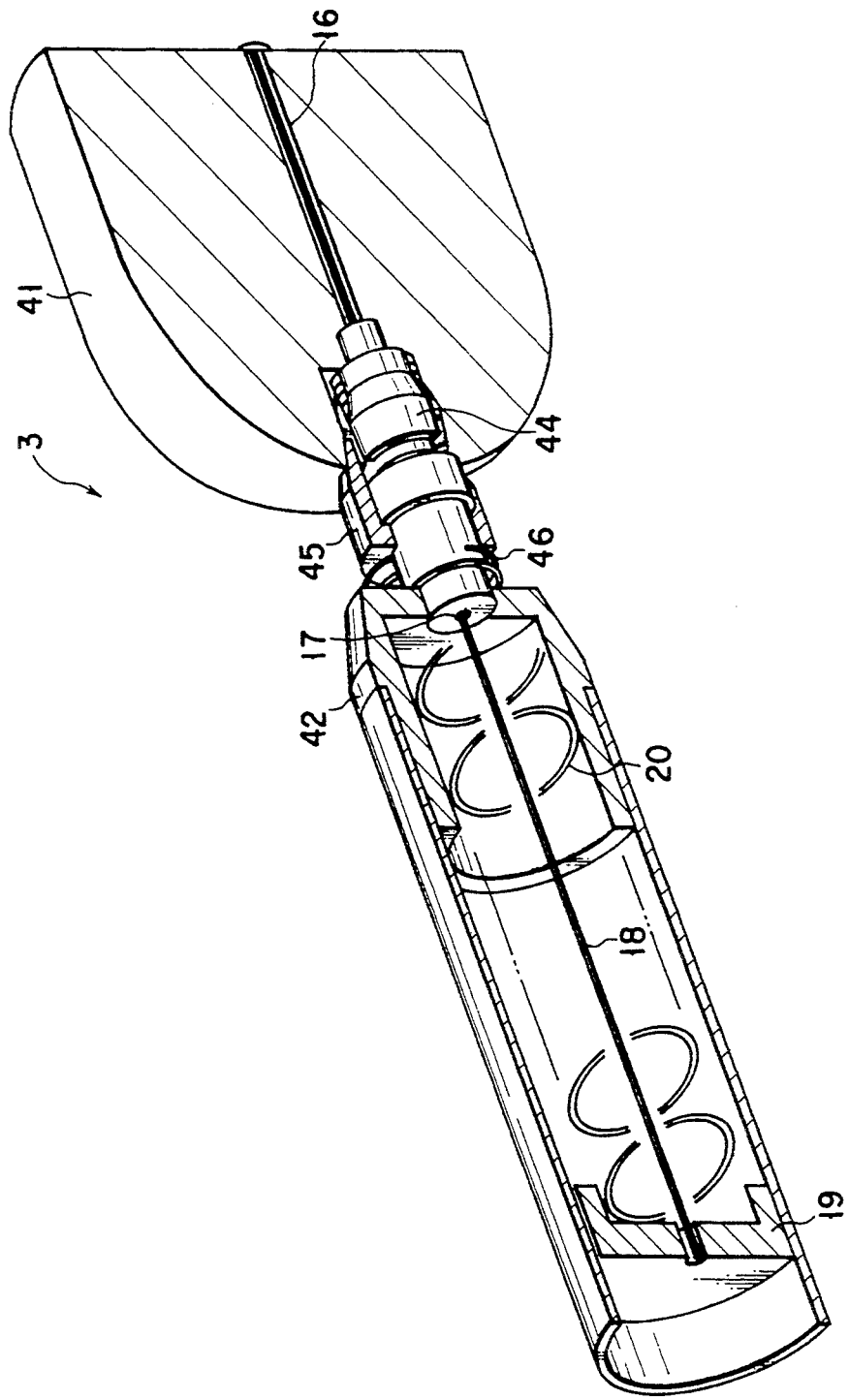
FIG. 4 is an enlarged perspective view of the part of the connecting mechanism shown in FIG. 3 in a state in which the fit portion engages the collet chuck.

Examples of the connecting mechanism 3 are shown in FIGS. 2 to 4. As shown in FIG. 2, the connecting mechanism 3 has a main body 41 formed as a block made of aluminum alloy (for example), to which six rod members 2a and 2b are connected.

FIGS. 3 and 4 illustrate how to connect a rod member 2a to the main body 41. A rod member 2b is similarly connected to the main body 1 using the same connecting mechanism. A fit element 42 is provided on one free end of the rod member 2a. On the forward end of the fit element 42 is formed a reversely tapered fit portion 43, i.e., a fit portion 43 increasing in diameter toward its forward end. In the main body 41 is formed a fit hole 47 formed at its forward edge portion with a tapered inner peripheral surface. Provided in the fit hole 47 is a collet chuck 44 including a cylindrical wall having a reversely tapered inner peripheral surface adapted to be fitted on the fit portion 43. A plurality of axially extending grooves 48 are formed in the cylindrical wall of the collet chuck 44. The collet chuck 44 radially expands with a relatively small elastic force such that it engages the fit portion 43 by a relatively small force against the elastic force.

A cylindrical locking sleeve 45 surrounds the fit portion 43 and is slidable axially thereof. The inner peripheral surface of the locking sleeve 45 is slightly tapered so as to be closely mounted on the outer peripheral surface of the collet chuck 44, whereby the collet chuck 44 cannot be elastically extended when the locking sleeve 45 is mounted on the collet chuck 44. The outer peripheral surface of the forward end portion of the locking sleeve 45 is also tapered. The locking sleeve 45 is biased by means of a spring 46 toward the forward end of the fit portion 43.

The main body 41 and the fit portion 43 have, respectively, through holes 16 and 17 coaxially with the main body 41 and the fit portion 43. An elongated member such as a thin wire 18 extends through these through holes 16 and 17. One end portion of the wire 18 is connected to the main body 41.

A slide member 19 is housed in the pipe 11 so as to be movable axially. The other end portion of the wire 18 is connected to the slide member 19. A compression coil spring 20 is provided in the pipe 11 and biases the slide member 19 so as to separate the sliding member 19 from the fit portion 43. The spring 20 gives the wire 18 such tension as biases the wire 18 so as to pull it into the pipe 11.

Due to the tension thus applied to the wire 18, the fit portion 43 on the rod member 2a is pulled into the collet chuck 44 in the main body 41 and thus fitted to the collect chuck 44. In a free state, the collet chuck 44 is expanded elastically radially. As the fit portion 43 advances, the locking sleeve 45 abuts against the forward end of the collet chuck 44 and then retracts by compressing the spring 46. When the fit portion 43 is fully inserted in the collet chuck 44, the chuck 44 reduces its diameter elastically. Thus, the locking sleeve 45 advances and is mounted on the outer peripheral surface of the collet chuck 44, thereby preventing the collet chuck 44 from being expanded such that the collet chuck 44 is in a locked state. It is thought that the collet chuck 44 as well as the fit portion 43 would be extended radially when a load in an expanding direction of the collet chuck 44 is applied to the fit portion 43. Since, however, the outer peripheral surface of the forward end portion of the locking sleeve 45 is closely fitted on to the inner peripheral surface of the fit hole 47, the locking sleeve 45 is not expanded elastically. This prevents this disadvantage and ensures locking of the collet chuck 44.

It will now be explained how to fold the truss structure prior to launching into the space. Upon disengaging the connecting mechanism, the locking sleeve 45 is retracted against the biasing force of the spring 46. Then, the collet chuck 44 is unlocked, and the fit portion 43 can be pulled out of the collet chuck 44 easily.

When the rod member 2a is moved in the opposite direction to the direction toward the main body 41 against the spring 20 in the state in which the connecting mechanism 3 is released, the rod member 2a and the main body 41 are connected only by the flexible wire 18, as shown in FIG. 3. The rod member 2a (2b) can be rotated with respect to the main body 41 so as to point any direction. This allows the truss structure to be folded.

It will now be explained how to extend the truss structure 1. As the rod member 2a (2b) is moved toward the main body 41 by the tension of the wire 18, and the adjacent end of the rod member 2a (2b) to the main body 41 is inserted in the collet chuck 44 and locked thereto by the locking sleeve 45. The rod member 2a (2b) is fixed to the main body 41 so as to be directed in the predetermined direction, and the truss structure 1 is extended. Since the gravitational force is low in space, the truss structure can be extended only by the biasing force of the spring 20.

The connecting mechanism according to this invention is not limited to the above-mentioned embodiment but is applicable to a connecting mechanism for connecting other two members than rod members of a truss structure.

A second embodiment of this invention is shown in FIGS. 5 and 6, in which this invention is applied to a connecting mechanism of a foldable stay of a foldable shelf.

A shelf member 52 is connected at its one lateral side on a wall 50 by a hinge 51 so as to swing upward and downward. An inclined foldable stay 53 is pivotally connected at its both ends to the undersurface of the shelf member 52 and the wall 50 by hinges 55 and 54, respectively.

The stay 53 comprises two stay members 53a and 53b between which a connecting mechanism 3 is provided and is foldable at its central portion, i.e., at the adjacent ends of the stay members 53a and 53b. The connecting mechanism 3 has the same structure of the connecting mechanism 3 of the first embodiment of this invention, the description thereof being omitted.

When the stay members 53a and 53b are made aligned and locked by the connecting mechanism 3, the stay 53 is straightened, and the shelf member 51 is held substantially horizontally, as shown in FIG. 5.

After the connecting member 3 has been operated to unlock the stay members 53a and 53b, the shelf member 52 is rotated downward. The stay 53 is folded as shown in FIG. 6. The stay members 53a and 53b are connected by a spring biased wire which is the same as the spring biased wire 18 of the first embodiment such that they are not separated from each other. In order to set the shelf member 52 in a horizontal state again, the stay 53 is unfolded by rotating the shelf member 52 upward. Then, the connecting member 3 locks the stay members 53a and 53b together, and the stay 53 is held straightened.

A third embodiment of this invention is shown in FIG. 7, in which this invention is applied to a connecting mechanism of a walking stick. The walking stick comprises an upper portion 61, a lower portion 62, a connecting mechanism 3 provided between the both portions 61 and 62, and a grip 60 formed on the upper end of the upper portion 61. The connecting mechanism 3 has the same structure as the connecting mechanism 3 of the first embodiment, the description thereof being omitted. The stick is foldable at the connecting mechanism 3 after the connecting mechanism 3 has unlocked the upper and lowered portion 61 and 62. The wire of the connecting mechanism 3 can be omitted in order to separate the lower portion 62 from the upper portion 61 completely.

Since the locking sleeve prevents the collet chuck from being expanded when they are in a connected state, the elastic expanding force of the collet chuck required for expanding the collet chuck upon inserting the fit portion in the collet chuck can be made minimum, and thus the force required for fitting the fit portion to the collet chuck can be small. Due to the fact that the locking sleeve is fitted to the collet chuck after the fit portion has been fully inserted in the collet chuck, the biasing force of the spring for biasing the locking sleeve can also be small. In spite of these small forces, the two members are securely fixedly in a reliable manner.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A connecting mechanism for connecting two members together, each member having a free end portion, the connecting mechanism comprising:

a reversely tapered fit portion having a forward end portion and a rear end portion, said rear end portion of said fit portion being connected to said free end portion of one of said two members;

an elastically expanded collet chuck connected to said free end portion of the other of said two members, said collet chuck having a cylindrical wall with a reversely tapered inner peripheral surface and a reversely tapered outer peripheral surface, and axial grooves formed in said cylindrical wall of said collet chuck;

an axially slidable cylindrical locking sleeve slidably connected to said free end portion of said one of said two members, said cylindrical locking sleeve surrounding said fit portion and having an inner peripheral surface having a shape fittable onto said outer peripheral surface of said collet chuck so as to be fitted to said collet chuck; and a spring disposed between said one of said two members and said cylindrical locking sleeve for urging said cylindrical locking sleeve toward said forward end of said fit portion.

2. The connecting mechanism according to claim 1, wherein said other of said two members has a fit hole therein at said free end portion thereof, said fit hole having an inner peripheral surface, and said collet chuck being mounted in said fit hole with said outer peripheral surface of said collet chuck being in close contact with said inner peripheral surface of said fit hole.

3. The connecting mechanism according to claim 1 wherein said collet chuck is radially expandable.

4. The connecting mechanism according to claim 3, wherein when said cylindrical locking sleeve is fitted onto said outer peripheral surface of said collet chuck, said collet chuck is prevented from expanding.

5. The connecting mechanism according to claim 1, wherein when said cylindrical locking sleeve is fitted onto said outer peripheral surface of said collet chuck, said collet chuck is prevented from expanding.

6. The connecting mechanism according to claim 1, wherein said cylindrical locking sleeve is slidably mounted on said fit portion.

7. The connecting mechanism according to claim 1, further comprising an elongated member coupled to both of said connecting members to prevent said connecting members from completely separating when said fit portion is separated from said collet chuck.

8. The connecting mechanism according to claim 7, further comprising a biasing member in at least one of said two members for biasing an end portion of said elongated member away from the other of said two members.

* * * * *